(12) United States Patent
Pao et al.

(10) Patent No.: US 11,036,915 B2
(45) Date of Patent: Jun. 15, 2021

(54) DYNAMIC FONT SIMILARITY

(71) Applicant: ADOBE INC., San Jose, CA (US)

(72) Inventors: I-Ming Pao, Palo Alto, CA (US);
Zhaowen Wang, San Jose, CA (US);
Hailin Jin, San Jose, CA (US); Alan Lee Erickson, Highlands Ranch, CO (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/067,108

(22) Filed: Mar. 10, 2016

(65) Prior Publication Data

US 2017/0262414 A1    Sep. 14, 2017

(51) Int. Cl.
*G06F 40/109* (2020.01)
*G06N 3/04* (2006.01)

(52) U.S. Cl.
CPC ......... *G06F 40/109* (2020.01); *G06N 3/0454* (2013.01)

(58) Field of Classification Search
None
See application file for complete search history.

(56) References Cited

U.S. PATENT DOCUMENTS

2005/0193336 A1* 9/2005 Fux ................... G06F 17/214
715/269
2011/0128291 A1* 6/2011 Miyazawa ........... G06F 17/214
345/471
2015/0063688 A1* 3/2015 Bhardwaj ............... G06K 9/18
382/159
2015/0097842 A1* 4/2015 Kaasila ............... G06K 9/6215
345/471
2016/0314377 A1* 10/2016 Vieira .................. G06K 9/6267

OTHER PUBLICATIONS

Jeffrey F. Baran et al., "Verifying Authorized Installation of a Font," Jun. 11, 2009, ip.com, Defensive Publication MFCP.149391, pp. 1-9, retrieved from https://priorart.ip.com/IPCOM/000184116 on Dec. 1, 2016.*

* cited by examiner

*Primary Examiner* — Chat C Do
*Assistant Examiner* — William C Wood
(74) *Attorney, Agent, or Firm* — Shook, Hardy & Bacon L.L.P.

(57) ABSTRACT

Embodiments of the present invention are directed at providing a font similarity system. In one embodiment, a new font is detected on a computing device. In response to the detection of the new font, a pre-computed font list is checked to determine whether the new font is included therein. The pre-computed font list including feature representations, generated independently of the computing device, for corresponding fonts. In response to a determination that the new font is absent from the pre-computed font list, a feature representation for the new font is generated. The generated feature representation capable of being utilized for a similarity analysis of the new font. The feature representation is then stored in a supplemental font list to enable identification of one or more fonts installed on the computing device that are similar to the new font. Other embodiments may be described and/or claimed.

20 Claims, 8 Drawing Sheets

DYNAMIC FONT SIMILARITY

BACKGROUND

Content designers often utilize a variety of fonts as part of content creation, such as to generate marketing materials, presentations, books, and so forth. These fonts are utilized to produce text that conveys information to an audience of the content created. As such, the fonts utilized in content creation are one of the major elements in content design. The number of fonts available to these content designers is continually increasing with tens of thousands of fonts currently available. As such, identifying the exact font that a content designer feels best conveys the desired information and best fits other design elements (e.g., images) of the content can be a difficult task. In some instances, a content designer is able to identify a font that is similar in appearance to what is desired by the content designer. In other instances, the content designer could have settled on a font to utilize for the content creation, but may want to find a font that is similar in appearance that may provide an even better fit for the desired content. As such, these content designers may wish to identify fonts that are similar to a currently selected font.

Identifying fonts that are similar to a given font is a known problem. Under the current state of the art, a content designer can utilize a static list of pre-determined font representations to identify fonts that are similar to a given font. New fonts, however, are released on an almost daily basis. As such, the static list of pre-determined font representations cannot take into account these newly released fonts when determining similar fonts and cannot locate fonts similar to a given font when that given font is one of these newly released fonts.

SUMMARY

Embodiments of the present invention are directed towards implementing a font similarity system that is capable of supplementing a pre-computed list of font representations with a dynamically updated supplemental list of font representations. The font representations included in the pre-computed list and the supplemental list can be utilized in determining similarity between fonts. To accomplish the dynamic updating of the supplemental list of font representations, the font similarity system is configured to generate font representations for newly installed fonts that are not included within the pre-computed font list. Because of this, a content designer can readily perform font similarity comparisons on a font regardless of whether the font is included within the pre-computed font list, while conserving resources of the computing device by utilizing the pre-computed list when a font representation is already available therein.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Fonts are one of the core tools in the tool box of a content designer. Choosing the right font for a design can be a very time consuming task that can be based on any number of factors. One of the main factors in choosing a font is the visual appearance of the font. In some instances, a designer may have chosen a font to use for a design, but is wondering if there are any visually similar fonts that may be a better fit for the design. Currently, the designer can utilize a static list of pre-computed font representations to identify fonts that are similar to a given font. A problem with this approach is that new fonts are released on an almost daily basis. These newly released fonts are not able to be reflected in the static list of pre-computed font representations because there are no mechanisms that enable such updating. As such, a user is currently restricted to those fonts that are included within the static list of pre-computed font representations which can cause the content designer to overlook newly released fonts that may be a better fit for the design.

Embodiments of the present invention are directed towards implementing a font similarity system that includes a supplemental list of font representations, in addition to a pre-computed list of font representations. The supplemental list of font representations is capable of being dynamically updated by the font similarity system to reflect newly installed fonts that have not been included in the pre-computed list of font representations. In addition, the font similarity system utilizes the font representations included within the pre-computed list, in conjunction with the font representations included within the supplemental list, to identify fonts that are similar to a given font.

To accomplish the above, the font similarity system implements functionality that can take a newly installed font and generate a font representation (e.g., a font feature vector) for the newly installed font that can be utilized in a font similarity analysis. This font representation can then be stored in the supplemental list of font representations. In embodiments, generating a font representation of the newly installed font can be accomplished, for example, by rendering an image of the newly installed font (i.e., an image of characters contained within the newly defined font) and performing a feature extraction on the image (e.g., via a convolutional neural network). Such a font similarity system enables a content designer to perform font similarity comparisons even where the font is not included within the pre-computed list. In addition, by utilizing the pre-computed list in conjunction with the supplemental list, resources of the computing device on which the font similarity system is executed can be saved by not having to generate a font representation for those fonts that are already included within the pre-computed list.

Figure 1:
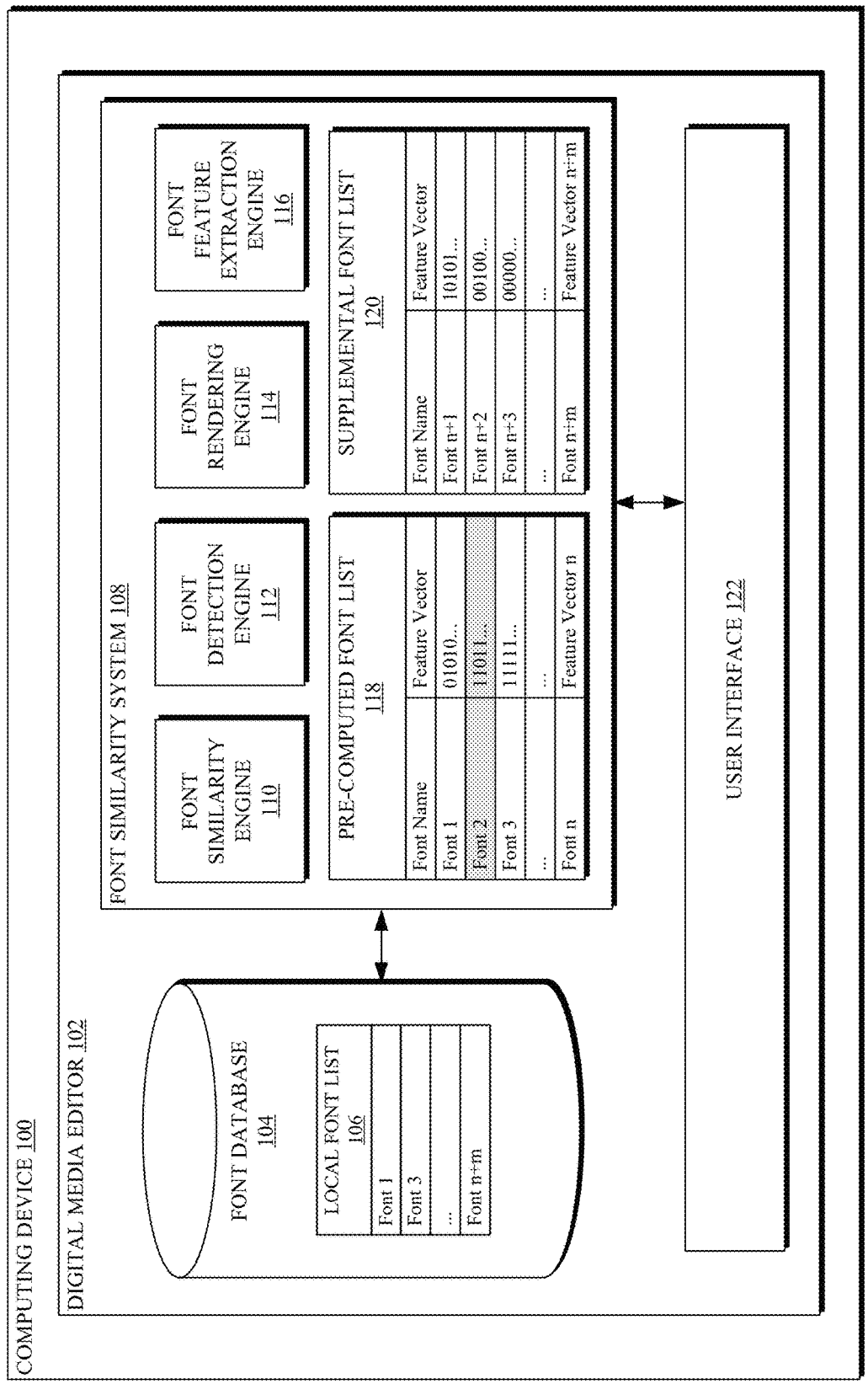
FIG. 1 depicts aspects of an illustrative computing device for implementing a font similarity system, in accordance with various embodiments of the present disclosure.
Figure 9:
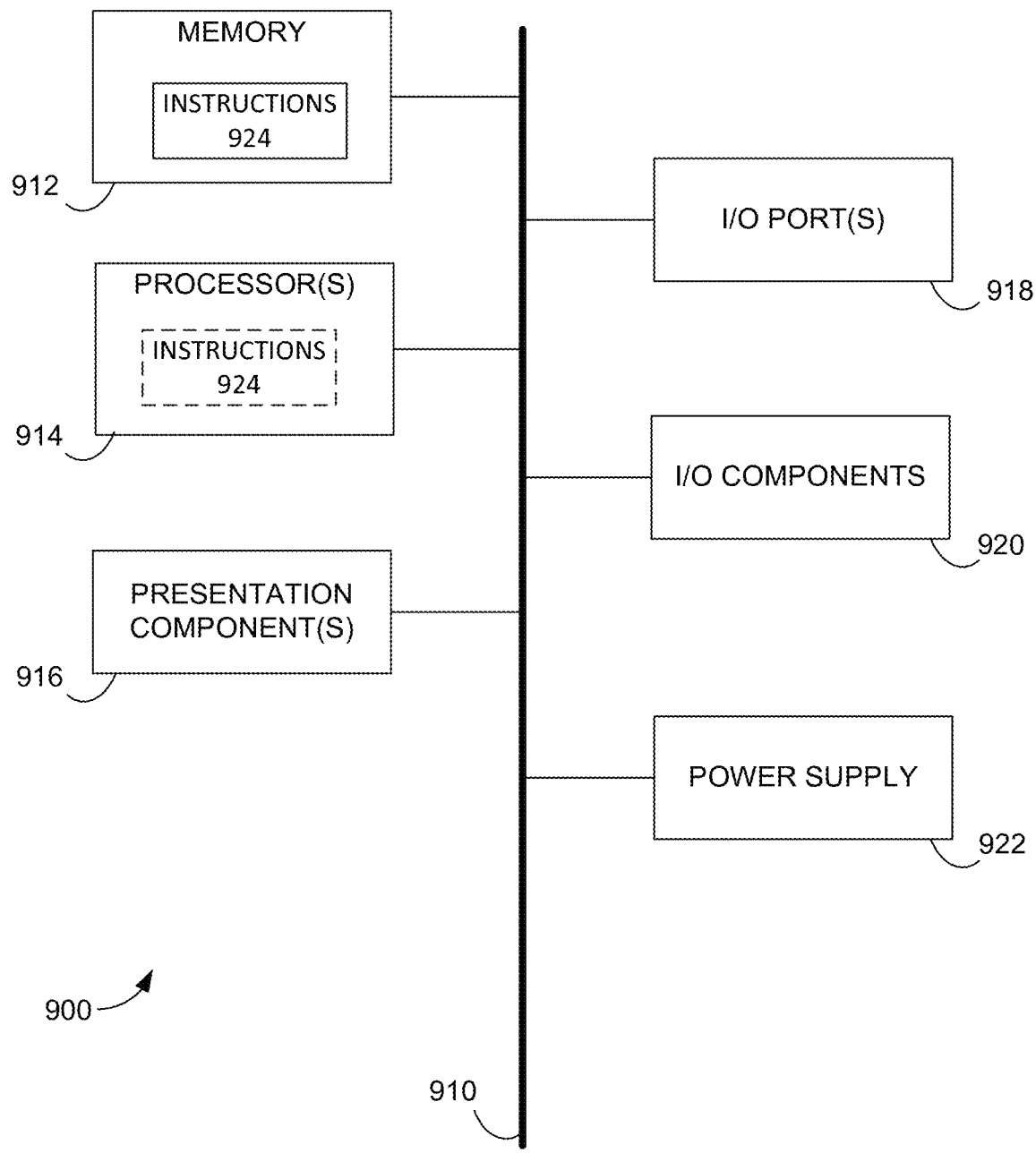
FIG. 9 is a block diagram of an example computing device in which embodiments of the present disclosure may be employed.

FIG. 1 depicts an example configuration of an illustrative computing device 100 for implementing a font similarity system 108 within a digital media editor 102, in accordance with various embodiments of the present disclosure. Computing device 100 can be any type of computing device, an example of which is depicted in FIG. 9. As depicted, computing device 100 includes a digital media editor 102.

Digital media editor 102 can be any editor capable of editing digital media. As used herein, digital media can include, for example, marketing materials, presentations, documents, books, posters, etc. Digital media editor 102 can include, for example, ADOBE® Illustrator, ADOBE® Photoshop, ADOBE® InDesign (all available from Adobe Systems Inc. of San Jose, Calif.), or any other suitable digital media editor.

Digital media editor 102 includes, among other things, a font database 104, a font similarity system 108, and a user interface 122. Font database 104 depicts a repository for storing fonts that are available for use within digital media editor 102. While referred to herein as a database, it will be appreciated that font database 104 can take the form of any other suitable digital storage mechanism. Font database 104 includes local font list 106. Local font list 106 represents a list of fonts that have been installed for use by a user of graphical media editor 102. Local font list 106 can include any number or types of fonts. For instance, local font list 106 can include tens of thousands of fonts that represent TypeKit fonts, OpenType fonts, etc. Local font list 106 can include fonts that have been installed by a user of computing device 100, as well as those fonts that may have been installed in conjunction with the installation of graphical media editor 102 or another application.

Font database 104 is coupled with font similarity system 108. Font similarity system 108 is configured to enable a user of graphical media editor 102 to identify fonts from the local font list 106 that are similar to a given font (e.g., user selected font). To accomplish this identification of similar fonts, font similarity system 108 includes a font similarity engine 110, a pre-computed font list 118, and a supplemental font list 120.

Pre-computed font list 118 correlates font identifiers (e.g., font name) with respective font representations (e.g., feature vector) that can be utilized for determining font similarity as described herein. These font identifiers can include identifiers for fonts that have been installed for use within digital media editor 102 as well as font identifiers for fonts that have yet to be installed for use within digital media editor 102. The representation of each identified font can include, for example, a font feature vector that is a numerical representation of font appearance. Such a font feature vector can be generated utilizing machine learning techniques, especially deep learning techniques, such as, for example, a convolutional neural network. An example of such a convolutional neural network is represented by DeepFont (available from Adobe Systems Inc. of San Jose, Calif.). In embodiments, pre-computed font list 118 is generated independently (i.e., without involvement or remotely) from computing device 100. This is because, in some instances, pre-computed font list 118 can include tens of thousands of font identifiers and correlated font representations that could be time and resource intensive to produce on computing device 100. For example, pre-computed font list 118 may be generated remotely by a font, or application, vendor which then transmits the pre-computed font list to computing device 100 for use by font similarity system 108. As such, pre-computed font list 118 may be static, or fixed, in nature with respect to computing device 100. It will be appreciated that there can be any number of reasons that a font may not appear in the pre-computed font list. These reasons include, for example, the font was created after the pre-computed font list was generated, the font was created by a different vendor than the vendor that created the pre-computed font list, or any number of other reasons.

Like pre-computed font list 108, supplemental font list 120 can correlate font identifiers (e.g., font name) with respective font representations (e.g., font feature vectors). These font identifiers, however, include identifiers for fonts that have been installed for use within digital media editor 102, but have not been included within pre-computed font list 118. Like pre-computed font list 118, the font representation correlated with each of the font identifiers within supplemental font list 120 can include a numerical representation of font appearance (e.g., a font feature vector). Unlike pre-computed font list 118, supplemental font list 120 is generated, or updated, utilizing computing device 100, and more specifically utilizing aspects of font similarity system 108 discussed below. As such, supplemental font list is dynamic, rather than static, with respect to computing device 100. Supplemental font list 120 can, therefore, act to supplement pre-computed font list 118 for those fonts that have been installed for use with digital media editor 102, but are not included within pre-computed font list 118. As such, without supplemental font list 120, there would be no way to perform a similarity analysis on computing device 100 for a newly installed font that is not within pre-computed font list 118. Utilizing the supplemental font list 120 in conjunction with the pre-computed font list 118, computing device 100 need only expend resources determining the representations for those fonts that are not included within pre-computed font list 118. Processes for generating entries and dynamically updating supplemental font list 120 are discussed below in reference to font detection engine 112, font rendering engine 114, and font feature extraction engine 116, in addition to the process flows discussed below in reference to FIGS. 3-7.

Pre-computed font list 118 is depicted as including representations for fonts 1 through 'n,' while supplemental font list 120 is depicted as including fonts 'n+1' through 'n+m.' Put another way, pre-computed font list 118 includes 'n' font representations and supplemental font list 120 includes 'm' font representations (the size of supplemental font list may change over time, e.g., if new fonts are installed later). Together, the font representations in pre-computed font list 118 and supplemental font list 120 cover the fonts in local font list 106. In addition, it can be seen that pre-computed font list 118 includes representations of fonts (e.g., font 2) that are not included in local font list 106. While only a single font representation is explicitly depicted as included within pre-computed font list 118 but not included within the local font list, it will be appreciated that pre-computed font list 118 can include any number of additional font representations that have not yet been installed for use by digital media editor 102 and therefore do not appear in local font list 106. In addition, while pre-computed font list 118 and supplemental font list 120 are depicted as being two distinct data structures, it will be appreciated that, in some embodiments, pre-computed font list 118 and supplemental font list 120 could be included within a single data structure. In such a data structure, an additional indicator (e.g., a flag) may be included for each font representation that indicates whether a respective font representation is part of pre-computed font list 118 or is part of supplemental font list 120.

Font similarity engine 110 can be configured to receive input from a user (e.g., selection via user interface 122) indicating that the user would like to view fonts that are similar to a selected font. In response to receiving the user input, font similarity engine 110 can retrieve a font representation for the selected font from one of the pre-computed font list 118 or the supplemental font list 120. The font similarity engine 110 can then identify fonts that are similar to the user selected font based on a comparison between the retrieved font representation for the selected font and the font representations included within pre-computed font list 118 and supplemental font list 120. Example processes or procedures that can be carried out by font similarity engine 110 are described in more detail below in reference to FIGS. 2 and 7.

Font detection engine 112, font rendering engine 114, and font feature extraction engine 116 can be utilized in conjunction to dynamically update supplemental font list 120 to include a newly installed font. To accomplish this, font detection engine 112 can be configured to detect when new fonts have been installed for use by digital media editor 102. If a new font is detected by font detection engine 112, then font detection engine 112 can determine whether the new font is already included within the pre-computed font list 118. If the new font is not already included within the pre-computed font list 118, then the font detection engine can pass the identified font to font rendering engine 114 for further processing. Example processes or procedures that can be carried out by font detection engine 112 are described in more detail below in reference to FIGS. 3 and 4.

Font rendering engine 114 can be communicatively coupled with font detection engine 112. Once the new font is passed to font rendering engine 114, font rendering engine 114 can be configured to generate an image of the font from which features of the font can be extracted. In embodiments, this can include rendering an image of the new font utilizing the Roman alphabet, or other suitable set of characters. This new font image can then be passed to font feature extraction engine 116 for subsequent processing. Example processes or procedures that can be carried out by font rendering engine 114 are described in more detail below in reference to FIGS. 3 and 5.

Font feature extraction engine 116 can be communicatively coupled with font rendering engine 114. Font feature extraction engine 116 can be configured to process the new font image to extract a font representation (e.g., a feature vector) from the new font image. To accomplish this, font feature extraction engine can be configured with a trained machine learning model that is configured to take the new font image as input and output the font representation. Such a model could be any suitable model utilized in machine learning, especially deep learning, such as, for example, a convolutional neural network. An example of such a convolutional neural network is represented by the previously mentioned DeepFont, although it will be appreciated that other suitably trained machine learning models may be utilized that are capable of producing font representation for use in determining font similarity. Font feature extraction engine 116 can then update supplemental font list 120 with the new font representation, and an associated font identifier, to enable the font similarity analysis described herein. Example processes or procedures that can be carried out by font feature extraction engine 116 are described in more detail below in reference to FIGS. 3 and 6.

Figure 2:
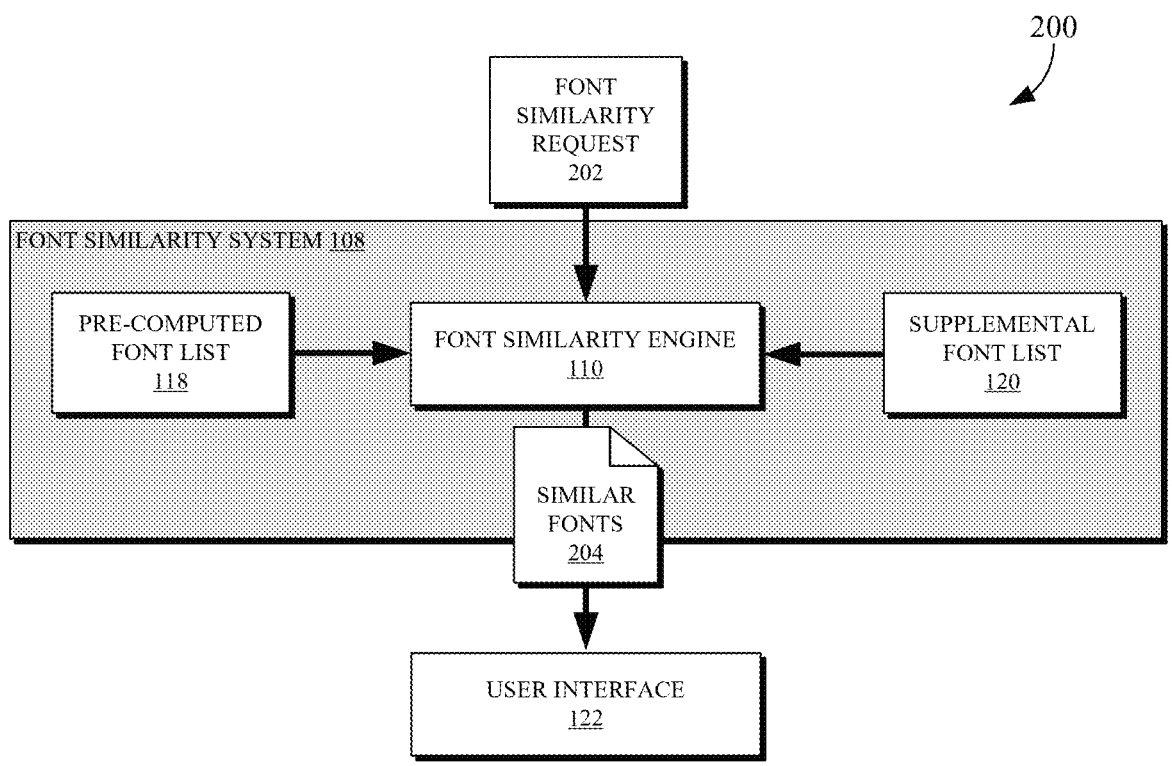
FIG. 2 depicts aspects of the illustrative font similarity system of FIG. 1 performing a font similarity analysis, in accordance with various embodiments of the present disclosure.

FIG. 2 depicts aspects of the illustrative font similarity system 108 of FIG. 1 performing a font similarity analysis 200, in accordance with various embodiments of the present disclosure. Because FIG. 2 depicts aspects of font similarity system 108 of FIG. 1, components with like numbering to that represented in FIG. 1 are intended to represent the same or similar components to those discussed in reference to FIG. 1. As depicted, font similarity analysis 200 can include, among other components, font similarity engine 110, pre-computed font list 118, and supplemental font list 120.

As discussed above in reference to FIG. 1, pre-computed font list 118 can correlate font identifiers with respective font representations (e.g., font feature vectors) that can be utilized for determining font similarity. In addition, supplemental font list 120 can correlate font identifiers with respective font representations (e.g., font feature vectors) that can be utilized for determining font similarity for those fonts that are absent from (i.e. not included within) pre-computed font list 118. As such, the use of pre-computed font list 118 in conjunction with supplemental font list 120 can enable a content designer to readily perform font similarity comparisons on the most recently installed fonts regardless of whether those fonts are included within the pre-computed font list.

Font similarity system 108 can be configured to receive a font similarity request 202. Such a request can be received, for example, in response to input from a user of digital media editor 102 requesting indicators of fonts (e.g., a list of fonts) that are similar to a font selected by the user. As depicted, such a request can be received by font similarity engine 110 of the font similarity system 108. In embodiments, font similarity request 202 includes an identifier (e.g., font name, or other unique identifier) of the font selected by the user. Such an identifier can be utilized in determining a collection of fonts that are similar to the selected font. In response to receiving font similarity request 202, font similarity engine 110 can extract the identifier included within font similarity request 202. Font similarity engine 110 can then cross-reference the extracted identifier with the font identifiers included within pre-computed font list 118 and supplemental font list 120 to identify a font representation that is correlated with the extracted identifier.

Once a font representation for the extracted identifier is identified by font similarity engine 110, the identified representation can be utilized to determine a collection of fonts (e.g., similar fonts 204) that are similar to the identified representation. To accomplish this, font similarity engine 110 can be configured to compare the identified representation with each font representation included within pre-computed font list 118 and supplemental font list 120. Because pre-computed font list 118 can include fonts that have not yet been installed for use by digital media editor 102, in some instances this comparison can be restricted to those fonts that are currently installed for use by digital media editor 102. Such an embodiment would save processing cycles and time by preventing possibly unnecessary processing of fonts that are not currently capable of being utilized within digital media editor 102.

In some embodiments, to accomplish the comparison, font similarity engine 110 can be configured to calculate a font similarity score for each font representation. Such a font similarity score is indicative of how similar, or dissimilar, the identified representation is to font representations included within pre-computed font list 118 and supplemental font list 120. The font similarity score can be determined by calculating, for example, an inner product or a Euclidean distance between the identified representation and each of the font representations included within pre-computed font list 118 and supplemental font list 120. In the case of an inner product, a larger font similarity score would indicate that two font representations are more similar than a smaller font similarity score. In the case of a Euclidean distance, a smaller font similarity score would indicate that two font representations are more similar than a larger font similarity score.

Once a font similarity score for fonts within pre-computed font list 118 and supplemental font list 120 has been determined, the identifiers for fonts that are above a predetermined level of similarity to the user selected can be output (e.g., similar fonts 204) to user interface 122. In some embodiments, the predetermined level of similarity could be a minimum score (e.g., for embodiments utilizing an inner product as the font similarity score) or a maximum score (e.g., for embodiments, utilizing a Euclidean distance as the font similarity score). In other embodiments, the predetermined level of similarity may be based on a number of fonts to return (e.g., top 5 most similar fonts). User interface 122 can then cause similar fonts 204 to be presented to the user to enable the user to determine if any of the similar fonts are more suitable for the user's needs (e.g., font appearance, font cost, etc.).

Figure 3:
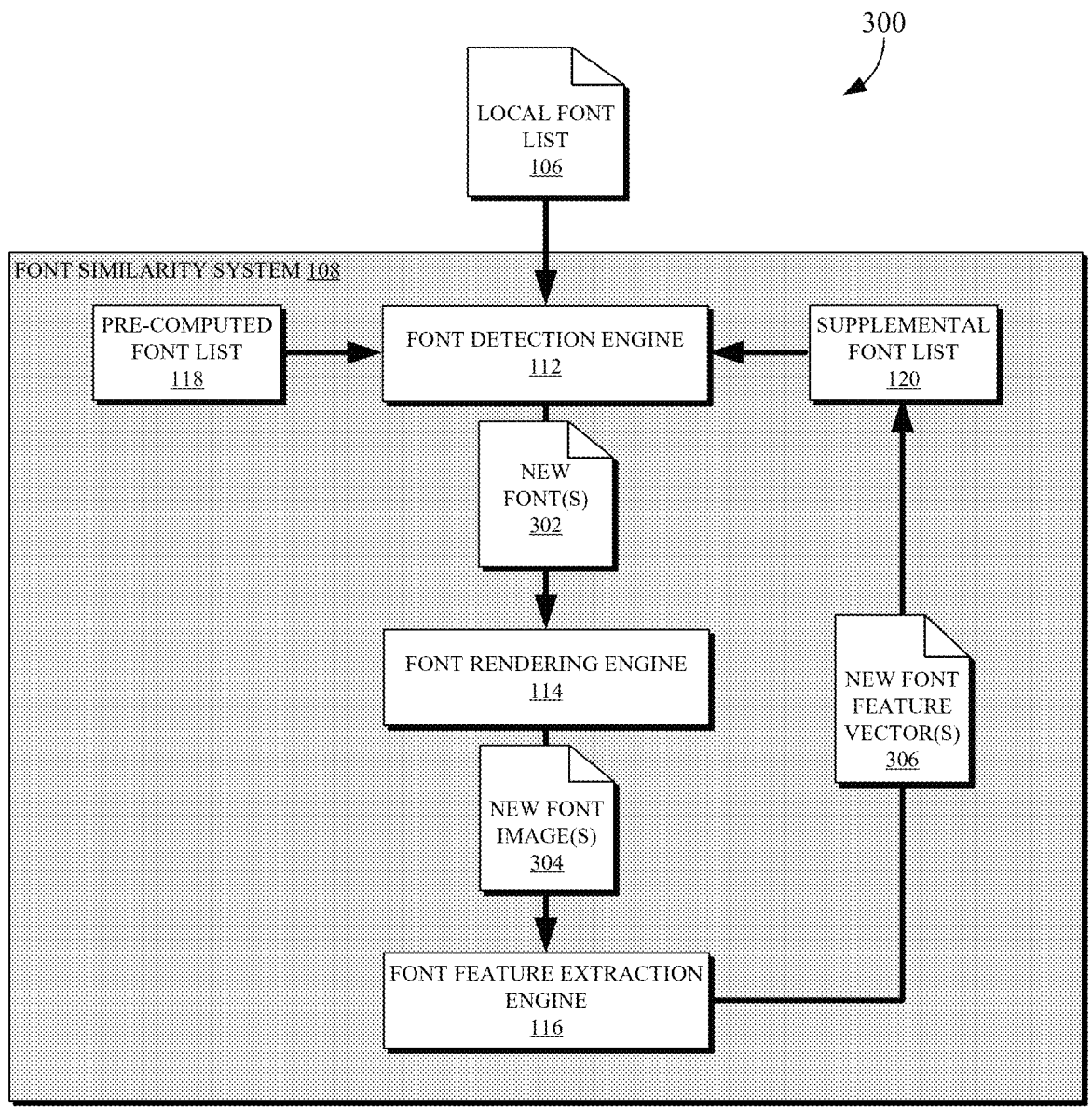
FIG. 3 depicts aspects of the illustrative font similarity system of FIG. 1 processing newly detected fonts for use by the font similarity system, in accordance with various embodiments of the present disclosure.

FIG. 3 depicts aspects of the illustrative font similarity system 108 of FIG. 1 performing a supplemental font list update 300 for newly detected fonts, in accordance with various embodiments of the present disclosure. Because FIG. 3 depicts aspects of font similarity system 108 of FIG. 1, components with like numbering to that represented in FIG. 1 are intended to represent the same or similar components to those discussed in reference to FIG. 1. As depicted, supplemental font list update 300 can include, among other components, font detection engine 112, font rendering engine 114, font feature extraction engine 116, pre-computed font list 118, and supplemental font list 120.

As discussed above in reference to FIG. 1, pre-computed font list 118 can correlate font identifiers with respective font representations (e.g., font feature vectors) that can be utilized for determining font similarity. In addition, supplemental font list 120 can correlate font identifiers with respective font representations (e.g., font feature vectors) that can be utilized for determining font similarity for those fonts that are not included within pre-computed font list 118. It will be appreciated that, as used herein, reference to a font being included or not included within the pre-computed font list or the supplemental font list refers to whether a font representation for the font is included, rather than the font itself.

Font detection engine 112 can be configured to detect when new fonts have been installed for use by digital media editor 102. This can be accomplished in any number of ways. For example, font detection engine 112 can be configured to periodically analyze local font list 106 to detect if new fonts have been added for use by digital media editor 102. In some embodiments, once new fonts have been detected by font detection engine 112, font detection engine 112 can be configured to determine if any of the new fonts are already included within pre-computed font list 118. If any of the new fonts are already included within pre-computed font list 118, then font detection engine 112 may no longer identify these fonts as new fonts to prevent further processing of these already included fonts. Font detection engine 112 can then pass fonts identified as new fonts (e.g., new font(s) 302) to font rendering engine 114.

Font rendering engine 114 can be configured to generate a font image of each font included in new font(s) 302. This can be accomplished, for example, utilizing characters from each of the fonts included in new font(s) 302 to render an image (e.g., bitmap (BMP)) of each new font. In embodiments, this can include rendering the roman alphabet, any subset thereof, or other suitable set of characters, utilizing each font included in new font(s) 302. The font images can be rendered to a non-display buffer, or other suitable storage mechanism, that is configured to store the rendered images for further processing by font similarity system 108. Once each new font is rendered, the resulting new font image(s) 304, or a reference thereto, can be passed to font feature extraction engine 116.

Font feature extraction engine 116 can be configured to apply a feature extraction scheme to the new font image(s) 304 to extract a representation (e.g., font feature vector) of each of the new font image(s). Such an extraction scheme could utilize a trained neural network (e.g., a convolutional neural network) that utilizes a feature representation between intermediate layers. An example of such a convolutional neural network is represented by previously mentioned DeepFont. Utilizing such a convolutional neural network is discussed in greater detail below in reference to FIG. 6. The extracted features can be utilized, as discussed in reference to FIGS. 2 and 7, to determine a level of similarity between each of new font(s) 302 and a given font. In embodiments, these extracted features can take the form of a font feature vector (e.g., new font feature vector(s) 306). Once the features have been extracted from the new font image(s) 304 by the font feature extraction engine 116, the new font feature vector(s) 306 can be stored in supplemental font list 120 for later use by font similarity system 108.

Figure 4:
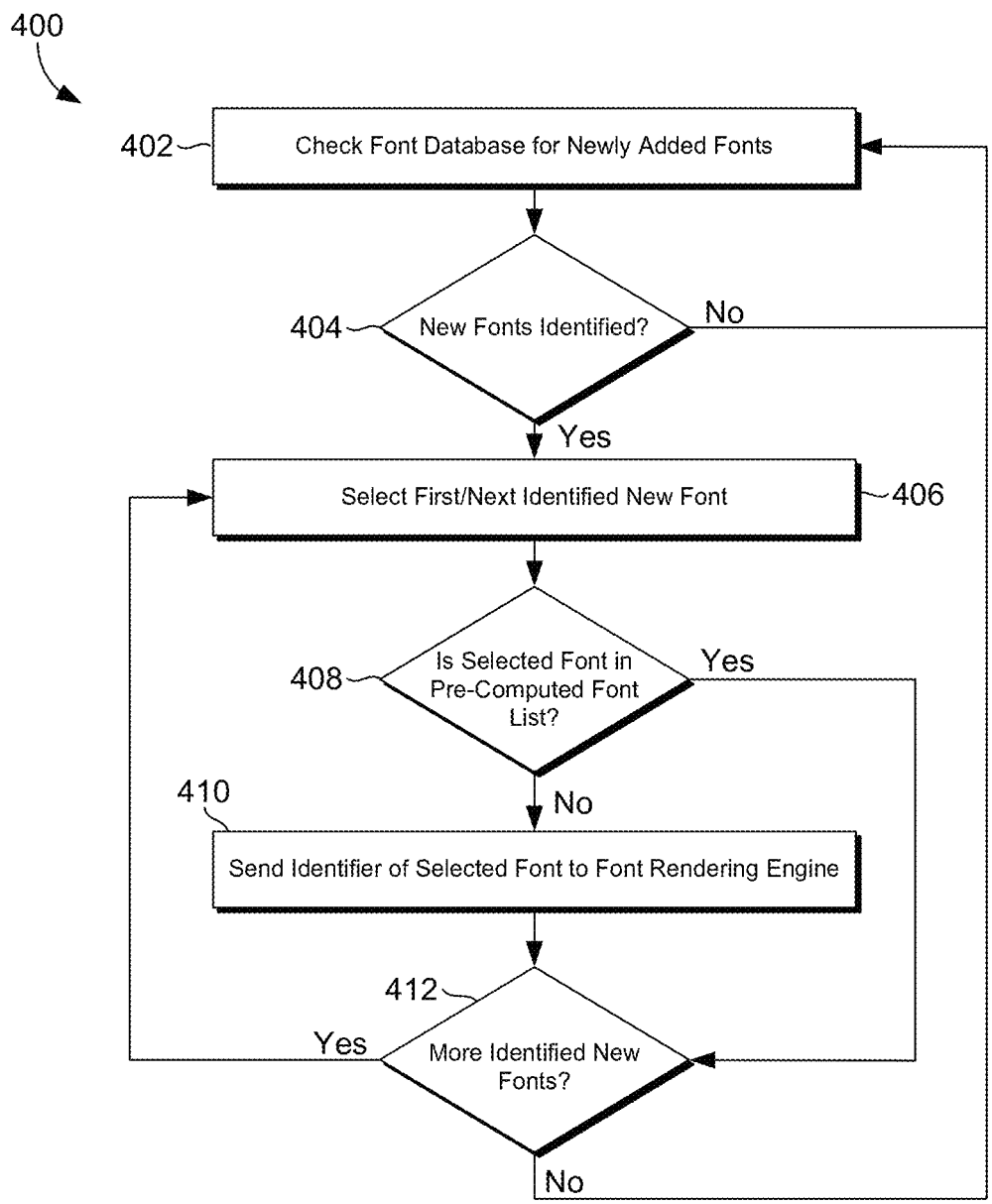
FIG. 4 illustrates a process flow depicting an example font detection process, in accordance with various embodiments of the present disclosure.

FIG. 4 illustrates a process flow 400 depicting an example process for detecting when new fonts have been installed for use by a digital media editing environment (e.g., digital media editor 102 of FIG. 1), in accordance with various embodiments of the present disclosure. Process flow 400 could be carried out, for example by font detection engine 112 of FIGS. 1 and 3.

As depicted, process flow 400 begins at block 402 where a font database (e.g., font database 104 of FIG. 1) is checked for any newly added fonts. This can be accomplished in any number of ways. For example, the number of fonts in the font database (e.g., the number of fonts in local font list 106) could be queried to determine if the number of fonts has increased since a previous query. In other embodiments, such a font database may maintain a version number that is updated, or incremented, upon installation of any new fonts. In such embodiments, the version number can be checked and compared with a previously recorded version number to determine if any fonts have been newly installed.

At block 404 a determination is made as to whether any new fonts were identified at block 402. If no new fonts were identified, then the processing can proceed back to block 402 to again check the font database for newly added fonts. In some embodiments, there can be a delay that is applied between determining that there are no new fonts at block 404 and returning to block 402 to again check to for newly added fonts. Such a delay could represent an interval (e.g., 5 seconds, 1 minute, etc.) at which to periodically check the font database for newly added fonts.

If, on the other hand, new fonts were identified at block 402, the processing can proceed to block 406 where a first identified new font can be selected. Once the first identified new font is selected, processing can proceed to block 408 where a determination is made as to whether the selected font already has a representation (e.g., font feature vector) included in the pre-computed font list (e.g., pre-computed font list 118 of FIGS. 1-3). This determination can be made based off of a cross-reference of an identifier associated with the selected font (e.g., the font name) with corresponding font identifiers included within the pre-computed font list.

If the selected font is not already included within the pre-computed font list, then the processing can proceed to block 410 where the identifier of the selected font is sent to a font rendering engine (e.g., font rendering engine 114 of FIGS. 1 & 3), after which processing can proceed to block 412. If, on the other hand, the selected font is already included within the pre-computed font list, then processing can proceed to block 412 where a determination is made as to whether any more identified new fonts remain for processing. If any more identified new fonts remain for processing, then processing can proceed to block 406 where a next identified new font is selected and the above described processes can be repeated for the next newly identified font. If no more identified new fonts remain, processing can proceed back to block 402 where process flow 400 can start again.

Figure 5:
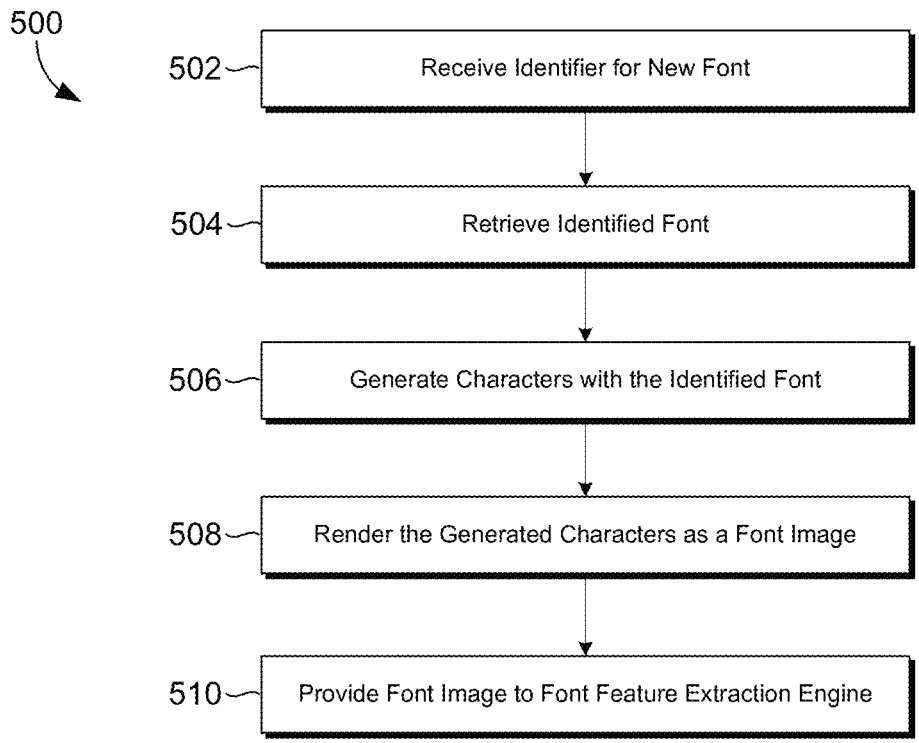
FIG. 5 illustrates a process flow depicting an example font rendering process, in accordance with various embodiments of the present disclosure.

FIG. 5 illustrates a process flow 500 depicting an example process for rendering font images of newly identified fonts, in accordance with various embodiments of the present disclosure. Process flow 500 could be carried out, for example by font rendering engine 114 of FIGS. 1 & 3.

Process flow 500 can begin at block 502 where an identifier of a new font is received. Such an identifier could be, for example a font name associated with the new font, or any other unique identifier associated with the new font that can be utilized to locate the new font within a font database (e.g., font database 104 of FIG. 1) or other suitable font repository. In embodiments, such a font identifier could be received from font detection engine 112 of FIGS. 1 & 3.

Moving to block 504, the identifier of the new font can be utilized to retrieve the new font from the font database. This can be accomplished via any suitable mechanism, such as, for example, by querying the font database utilizing the identifier.

At block 506, the retrieved font can be utilized to generate characters to be utilized in generating an image of the font. In embodiments, these characters can include the roman alphabet, or any subset thereof, or any other set of characters that are included within the identified font. It will be appreciated that the set of characters may be selected to enable extraction of features (e.g., by font feature extraction engine 116 of FIGS. 1 & 3).

The characters for the identified font that were generated at block 506 can be rendered into a font image at block 508. Such a font image can be rendered in any conventional manner and can take the form of any suitable digital image format. Examples of suitable digital image formats can include, for example, a Joint Photographic Experts Group (JPEG) format, a Bitmap (BMP) format, a Tagged Image File Format (TIFF), a Portable Networks Graphic (PNG) format, a Graphics Interchange Format (GIF), or any other suitable format. In embodiments, the font image can be rendered into a non-display buffer or other suitable storage mechanism for further processing with a font similarity system (e.g., font similarity system 108 of FIGS. 1-3). Finally at block 510, the rendered font image can be provided to a font feature extraction engine (e.g., font feature extraction engine 116 of FIGS. 1 & 3).

Figure 6:
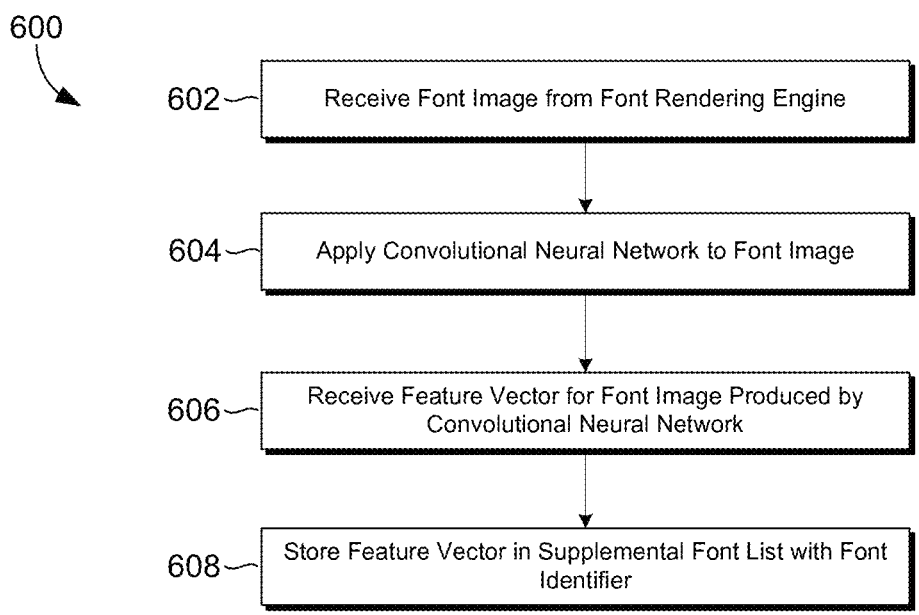
FIG. 6 illustrates a process flow depicting an example font feature extraction process, in accordance with various embodiments of the present disclosure.

FIG. 6 illustrates a process flow 600 depicting an example process for extracting features of a font from a font image, such as that produced through process flow 500 of FIG. 5, in accordance with various embodiments of the present disclosure. Process flow 600 could be carried out, for example by font feature extraction engine 116 of FIGS. 1 & 3.

Process flow 600 can begin at block 602 where a font image, or a reference to a location thereof, is received. Where a reference to the location of the font image is received, the font image may also be retrieved at block 602 utilizing the reference. Such a font image can be produced by a font rendering engine (e.g., font rendering engine 114 of FIGS. 1 & 3).

At block 604 a convolutional neural network is applied to the font image to extract a feature vector for the font image. It will be appreciated that such a convolutional neural network would be previously trained utilizing a labeled set of training font images. An example of such a convolutional neural network is the previously mentioned DeepFont, however, any neural network, or other similarly trained machine learning model, that utilizes vector representations between intermediate layers, as discussed below, can be utilized without departing from the scope of this disclosure.

In general, a convolutional neural network is composed of a series of intermediate layers where one intermediate layer takes as input the output of the previous intermediate layer. These intermediate layers include a number of convolutional layers. These convolutional layers can, in some embodiments, have one or more normalization layers and/or one or more pooling layers interspersed between. These intermediate layers can also include a number of fully connected layers. The outputs of these fully connected layers can include a representation (e.g., feature vector representation) of the original input (e.g., the font image) to the convolutional neural network. As such, the output of these fully connected layers can be utilized as a representation of the font from which the font image was rendered. For instance, the DeepFont convolutional neural network includes three fully connected layers (FC6, FC7, and FC8). As an example, the output of fully connected layer FC7 of the DeepFont convolutional neural network can be utilized as the font feature vector of the font from which the font image was rendered.

At block 606 the feature vector that was produced by the convolutional neural network at block 604 is received from the convolutional neural network. Finally, at block 608, the feature vector is stored in a supplemental font list (e.g., supplemental font list 120 of FIG. 1) along with a font identifier (e.g., font name) that identifies the font for which the feature vector was produced.

Figure 7:
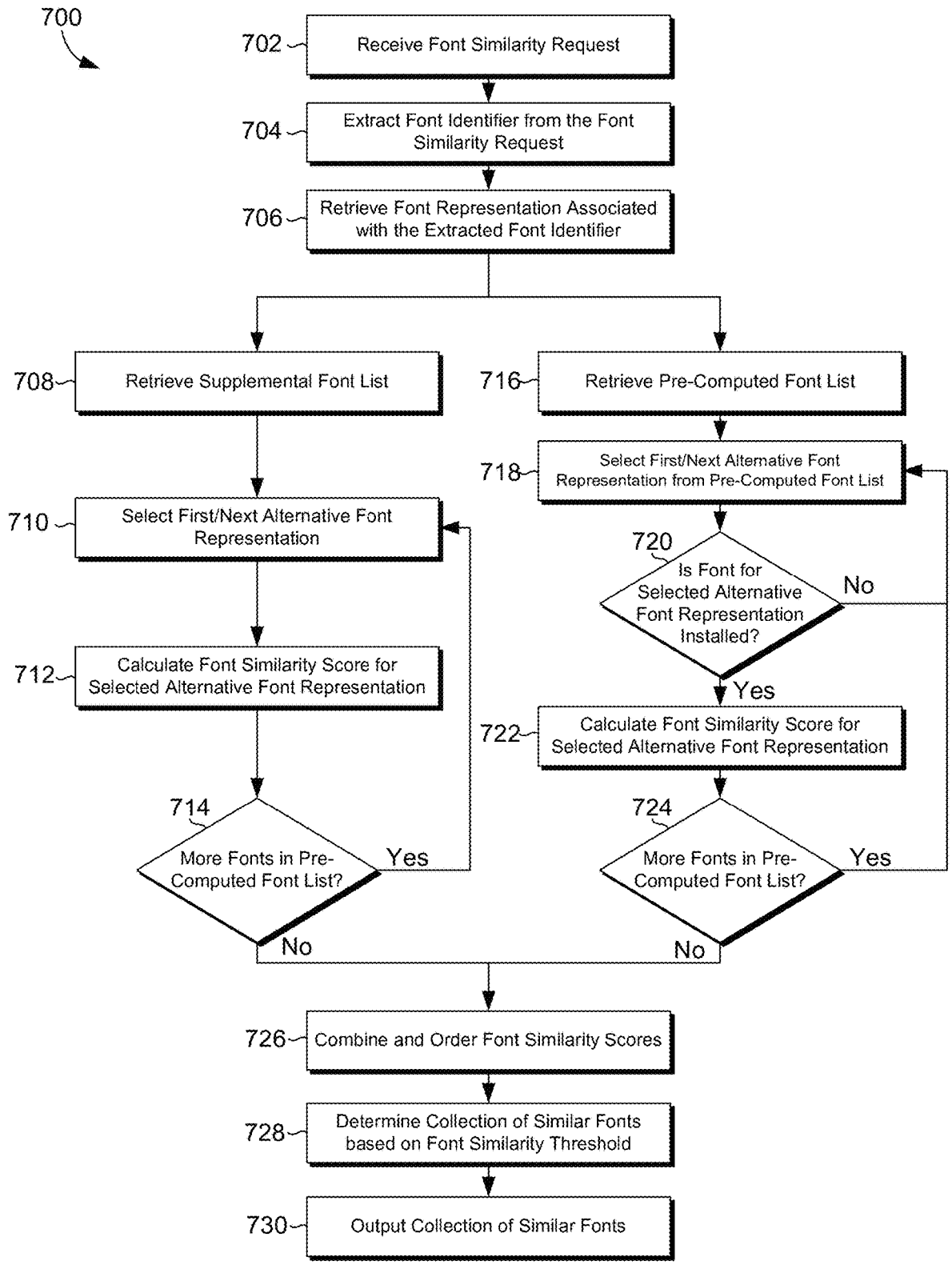
FIG. 7 illustrates a process flow depicting an example font similarity process, in accordance with various embodiments of the present disclosure.

FIG. 7 illustrates a process flow 700 depicting an example font similarity process, in accordance with various embodiments of the present disclosure. Process flow 700 could be carried out, for example by font similarity engine 110 of FIGS. 1 & 2. Process flow 700 begins at block 702 where a font similarity request is received. Such a request can be received, for example, in response to input from a user requesting fonts that are similar to a user selected font. In embodiments, such a request can include an identifier (e.g., font name, or other suitable unique identifier) of the user selected font to facilitate determining a collection of fonts that are similar to the user selected font. As such, at block 704, the font identifier included in the font similarity request can be extracted from the font similarity request at block 704.

Moving to block 706, a font representation associated with the extracted font identifier can be retrieved. Such a representation may be, for example, a vector representation that can be utilized in comparing the selected font against a corresponding representation of another font to determine a level of similarity between the two fonts. The retrieval of such a representation for the extracted font identifier can be accomplished by, for example, locating the extracted font identifier in a pre-computed font list (e.g., pre-computed font list 118 of FIGS. 1-3) or a supplementary font list (e.g., supplementary font list 120 of FIGS. 1-3). Once the extracted font identifier is located, the correlated font representation can be retrieved.

Once the font representation for the extracted font identifier is retrieved, this font representation can be compared with other font representations included within the pre-computed font list and the supplemental font list to identify a collection of fonts that are similar to the user selected font. Such a process can be accomplished in a parallel fashion, as such, the process flow after block 706 splits into two streams, one for the supplemental font list and one for the pre-computed font list. However, it will also be appreciated that such a process can also be executed in a sequential fashion as well. In an effort to distinguish between the font representations, the font representation for the extracted font identifier may be referred to as a base, or original, font representation while the font representations against which the base font representation is compared can be referred to as alternative font representations.

At block 708, the supplemental font list can be retrieved. At block 710, the first alternative font representation within the supplemental font list is selected for comparison against the base font representation. At block 712, a font similarity score for the selected alternative font representation can be calculated. Such a font similarity score is indicative of how similar, or dissimilar, the selected alternative font representation is to the base font representation. The font similarity score can be determined by calculating, for example, an inner product or a Euclidean distance between the base font representation and the selected alternative font representation. In the case of an inner product a larger font similarity score would indicate that two font representations are more similar than a smaller font similarity score. In the case of a Euclidean distance, a smaller font similarity score would indicate that two font representations are more similar than a larger font similarity score.

Once the font similarity score for the selected alternative font representation is calculated, the process can move to block 714 where a determination is made as to whether there are any additional fonts in the supplemental font list for which no font similarity score has been determined. If the result of the decision at block 714 is in the affirmative, then processing can return to block 710 where a next alternative font representation is selected and the above described process can be repeated. If, on the other hand, the decision at block 714 is in the negative, the processing can proceed to block 726.

The parallel path for the pre-computed font list begins at block 716. At block 716, the pre-computed font list can be retrieved. At block 718, the first alternative font representation within the pre-computed font list is selected for comparison against the base font representation. At block 720 a decision is made as to whether the font for the selected alternative font representation has been installed. This can be accomplished in any number of ways. For example, a font database (e.g., font database 104 of FIG. 1) may be queried to see if the font has been installed. As another example, there could be a field included within the pre-computed font list that is indicative of whether the font has been installed. Such a field could take the form of a binary flag where a '1,' or other suitable character, indicates that the font is installed and a '0,' or other suitable character, indicates that the font has not yet been installed. It will be appreciated, that this flag could be changed by, for example, the font detection engine, described herein, upon detecting a new font has been installed that is included within the pre-computed font list. In some embodiments, if the font for the selected alternative font representation has not yet been installed, then the processing can proceed back to block 718 where a next alternative font representation is selected from the pre-computed font list.

In other embodiments, block 720 may be omitted. In such embodiments, it could be desirable to identify similar fonts that have not yet been installed on the user's system to enable the user to determine whether the user would like to acquire those similar fonts. To inform the user of a similar font that has not yet been installed on the system, the font similarity engine, in which process flow 700 is executing, may merely output (e.g., display or cause to be displayed) the font identifier to enable the user to lookup the font or could retrieve (e.g., from a digital repository (e.g., database) over a network) an image, or other depiction, of the font to cause a depiction of the font to be displayed to the user. In addition, in some embodiments, the information provided to a user in such a circumstance may include a link (e.g., hyperlink), uniform resource locator (URL), or other suitable location information that identifies where the user can acquire the uninstalled font. In embodiments, the user may be able to select (e.g., via a setting through a user interface) whether the user would like to view similar fonts that have not yet been installed on the user's system or to restrict the processing to those fonts that are currently installed on the system.

Returning to the depicted embodiment, if the decision at block 720 is in the negative, then processing can proceed back to block 718 where a next alternative font representation can be selected and the above described process can be repeated. If, on the other hand, the decision at block 720 is in the affirmative, then processing can proceed to block 722. At block 722 a font similarity score can be calculated for the selected alternative font representation as described in reference to block 712, above.

Once the font similarity score for the selected alternative font representation is calculated, the process can move to block 724 where a determination is made as to whether there are any additional fonts in the pre-computed font list for which no font similarity score has been determined. If the result of the decision at block 724 is in the affirmative, then processing can return to block 718 where a next alternative font representation is selected and the above described process can be repeated. If, on the other hand, the decision at block 724 is in the negative, the processing can proceed to block 726.

At block 726 the font similarity scores calculated at block 712 and block 722 can be combined and ordered based on the font similarity scores (e.g., in ascending or descending order of similarity to the base font representation). Once the font similarity scores have been ordered, the identifiers for the alternative font representations that are above a predetermined level of similarity, or satisfy a predefined font similarity threshold, to the base font representation can be utilized to determine a collection of fonts that are most similar to the user selected font. In some embodiments, the font similarity threshold could be a minimum score (e.g., for embodiments utilizing an inner product as the font similarity score) or a maximum score (e.g., for embodiments, utilizing a Euclidean distance as the font similarity score). In other embodiments, the font similarity threshold may be based on a number of fonts to return (e.g., top 5 most similar fonts). Finally, at block 730, the collection of similar fonts is output to the user (e.g., via user interface 122 of FIG. 1) to enable the user to either maintain the use of the selected font or to choose a font from the collection of similar fonts that may be more appropriate to the user's needs (e.g., based on appearance, cost, etc.).

Figure 8:
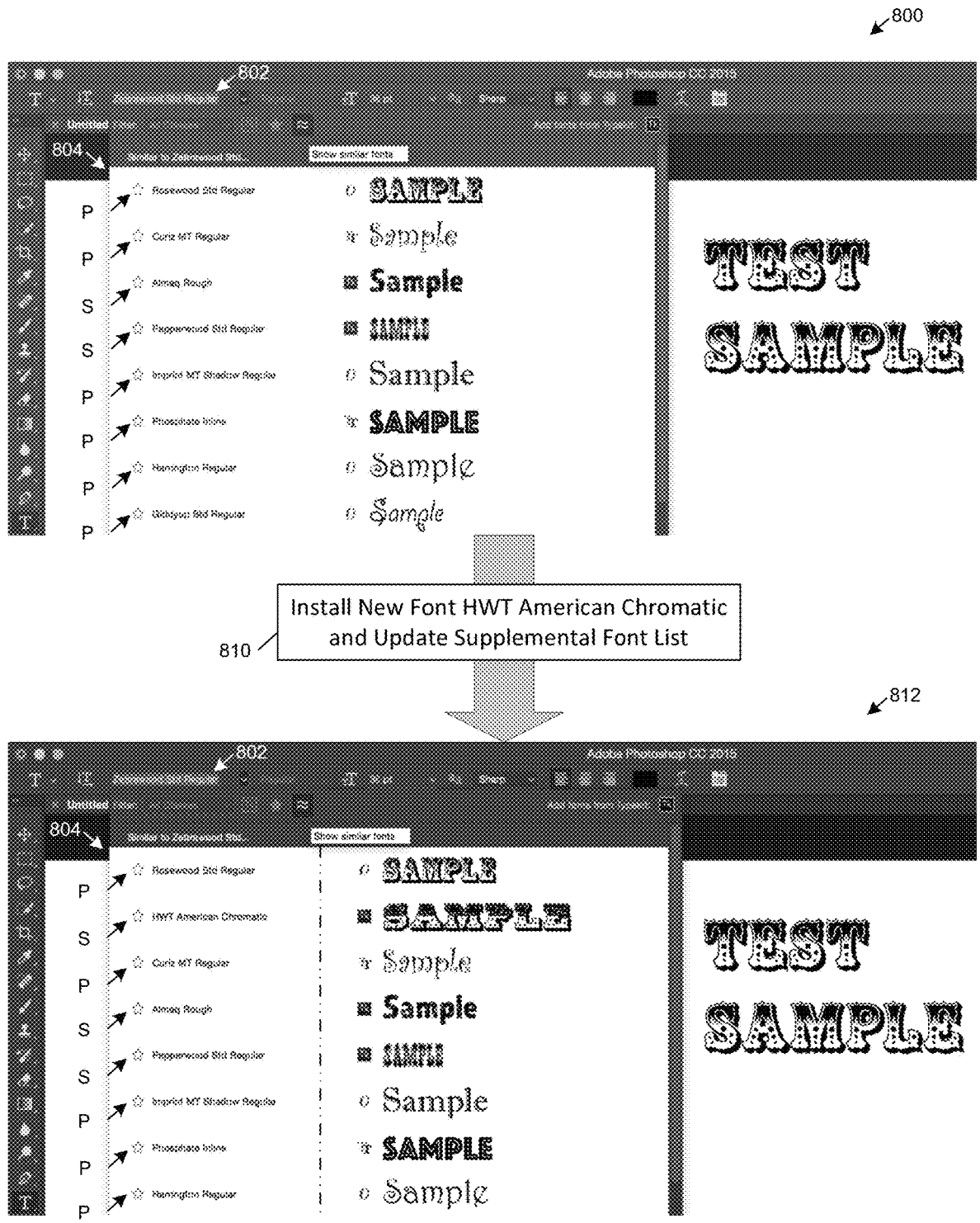
FIG. 8 is a graphical depiction of an illustrative user interface depicting updating of a font similarity list to reflect a newly installed font, in accordance with various embodiments of the present disclosure.

FIG. 8 is a graphical representation of an illustrative user interface depicting the updating of a collection of similar fonts 804 to reflect a newly installed font, in accordance with various embodiments of the present disclosure. As depicted, at 800 the collection of similar fonts 804 includes fonts that have been determined to be most similar to a base font 802, 'Zebrawood Std Regular.' In the depicted embodiments, similar fonts 804 includes fonts in descending order of similarity. As such, fonts that are determined to be more similar (e.g., via the font similarity score discussed above) are at a higher location than those fonts that are less similar. As depicted, the collection of similar fonts 804 includes fonts from a pre-computed font list (e.g., pre-computed font list 118 of FIGS. 1-3), those fonts designated with a 'P,' and a supplemental font list (e.g., supplemental font list 120 of FIGS. 1-3), those fonts designated with an 'S.' While the supplemental fonts depicted include only TypeKit fonts, it will be appreciated that this is merely meant to be illustrative of a possible configuration. Any combination of fonts can be included in either the supplemental font list or the pre-computed font list without departing from the scope of this disclosure. At 810 a new font 'HWT American Chromatic' is installed that is not included within the pre-computed font list. As such, the supplemental font list is updated to reflect the newly installed font. At 812, the collection of similar fonts 804 has now been updated to include the newly installed font as the second most similar font to base font 802.

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more computer storage media having instructions stored thereon, which, when executed by one or more processors of a single computing device, provide the single computing device with a font similarity system to:
    detect a new font installed on the single computing device;
    in response to detection of the new font, analyze a static pre-computed font list for the presence of the new font within the static pre-computed font list, the static pre-computed font list including a plurality of font representations for a corresponding plurality of fonts;
    in response to a determination that the new font installed on the computing device is absent from the static pre-computed font list that is generated independently of the single computing device, execute a font similarity system stored on the single computing device to generate a font representation of the new font;
    store the font representation of the new font in a dynamic supplemental font list updateable by the single computing device to enable a user of the single computing device to identify one or more fonts installed on the single computing device that are similar to the new font; and
    utilize at least one of the static pre-computed font list and the dynamic supplemental font list to cause a display of a similar font identified to be within a threshold of similarity to a selected font, wherein the threshold of similarity is based on a font similarity score determined for the similar font and the selected font.

2. The one or more computer storage media of claim 1, wherein the plurality of font representations is a first plurality of font representations and the plurality of fonts is a first plurality of fonts, and wherein the dynamic supplemental font list includes a second plurality of font representations for a corresponding second plurality of fonts.

3. The one or more computer readable storage media of claim 1, wherein the font similarity system is further to:
    render an image including a plurality of characters of the new font, and
    wherein to generate the font representation of the new font is based on the image.

4. The one or more computer storage media of claim 3, wherein to generate the font representation of the new font based on the image, the font similarity system is further to:
    apply a feature extraction scheme to the rendered image to generate the font representation of the new font.

5. The one or more computer storage media of claim 3, wherein to generate a font representation of the new font based on the image, the font similarity system is further to:
    apply a convolutional neural network to the image to generate the font representation of the new font.

6. The one or more computer storage media of claim 5, wherein the font representation of the new font is a feature vector representation produced by a fully connected intermediate layer of the convolutional neural network.

7. The one or more computer storage media of claim 1, wherein the plurality of feature font representations is a first plurality of font representations and the plurality of fonts is a first plurality of fonts, and wherein the font similarity system utilizes the at least one of the static pre-computed font list and the dynamic supplemental font list to cause display of the font identified to be within the threshold of similarity to the selected font by:
- receive a font similarity request that includes an identifier of the selected font, the font similarity request indicating that a user would like to view fonts that are similar to the selected font;
- retrieve the font representation of the selected font from either the static pre- computed font list or the dynamic supplemental font list utilizing the identifier of the selected font;
- identify the font within the threshold of similarity to the selected font based on a comparison of the font representation of the selected font against:
  - at least a subset of the first plurality of font representations included within the static pre-computed font list;
  - a second plurality of font representations included within the dynamic supplemental font list; and
- output identifiers associated with the identified font to cause the identified font to be displayed to the user to enable the user to determine whether to utilize one of the identified font instead of the selected font.

8. The one or more computer storage media of claim 7, wherein to identify fonts that are within the threshold of similarity to the selected font comprises:
- calculation of font similarity scores for each of the at least subset of the first plurality of font representations and the second plurality of font representations, the font similarity score indicating a level of similarity between a respective font representation and the font representation of the selected font.

9. The one or more computer storage media of claim 8, wherein the font similarity scores are based on one of an inner product or a Euclidean distance.

10. The one or more computer storage media of claim 7, wherein the selected font is the new font.

11. The one or more computer storage media of claim 7, wherein the determined fonts include the new font.

12. A computer-implemented method for determining font similarity comprising:
- receiving, by a font similarity system stored on a single computing device, input from a user indicating that the user would like to view a list of fonts that are similar to a selected font;
- analyzing, by the font similarity system, a first plurality of font representations of a static pre-computed font list, wherein the first plurality of font representations of the static pre-computed font list are generated independently of the single computing device;
- analyzing, by the font similarity system, a second plurality of font representations of a dynamic supplemental font list updateable by executing the font similarity system stored on the single computing device, the second plurality of font representations generated by the font similarity system of the single computing device to supplement the first plurality of font representations of the static pre-computed font list;
- retrieving, by the font similarity system, a font representation of the selected font from either the analyzed static pre-computed font list or the analyzed dynamic supplemental font list;
- determining, by the font similarity system, fonts that are within a threshold of similarity to the selected font based on a comparison, using font feature vectors, of the font representation of the selected font against at least a first subset of the first plurality of font representations of the static pre-computed font list and at least a second subset of the second plurality of font representations of the dynamic supplemental font list; and
- causing, by the font similarity system, the determined fonts to be displayed to the user to enable the user to determine whether to utilize one of the determined fonts instead of the selected font.

13. The computer-implemented method of claim 12, wherein the comparison, using the font feature vectors comprises:
- calculating a font similarity score for each of the at least first subset of the first plurality of font representations and the at least second subset of the second plurality of font representations, the font similarity score indicating a level of similarity between a respective font representation, wherein the respective font representation is a first font feature vector, and the font representation of the selected font, wherein the font representation of the selected font is a second font feature vector.

14. The computer-implemented method of claim 13, wherein calculating the font similarity score includes calculating one of an inner product or a Euclidean distance between the first font feature vector and the second font feature vector.

15. The computer-implemented method of claim 12, further comprising:
- detecting, by the font similarity system, a new font installed on the single computing device;
- in response to detecting the new font, analyzing the static pre-computed font list to determine whether a font representation of the new font is included within the static pre-computed font list;
- in response to determining that the font representation of the new font is absent from the static pre-computed font list, generating a font representation of the new font that can be utilized for a similarity analysis of the new font; and
- storing, on the single computing device, the font representation of the new font in the dynamic supplemental font list to enable a user of the single computing device to identify one or more fonts installed on the single computing device that are similar to the new font.

16. The computer-implemented method of claim 12, wherein generating the font representation of the new font further comprises:
- rendering an image including a plurality of characters of the new font; and
- applying a feature extraction scheme to the rendered image to extract features of the image, wherein the font representation of the new font comprises the extracted features.

17. The computer-implemented method of claim 16, wherein the feature extraction scheme is a convolutional neural network, and wherein the font representation of the new font is a feature vector representation produced by a fully connected intermediate layer of the convolutional neural network.

18. A computing system comprising:
- one or more processors; and
- one or more computer-readable storage media, coupled with the one or more processors, having instructions stored thereon, which, when executed by the one or more processors, provide the computing system to:
- detect a new font installed on a single computing device;

in response to detection of the new font, analyze a static pre-computed font list for the presence of a feature vector representation of the new font within the static pre-computed font list, the static pre-computed font list including a plurality of feature vector representations for a corresponding plurality of fonts; and in response to a determination that the feature vector representation of the new font is absent from the static pre-computed font list that is generated independently of the single computing device, execute using a font similarity system stored on the single computing device to generate a font representation of the new font by:
    rendering, using the single computing device, an image including a plurality of characters of the new font, and
    applying a convolutional neural network to the rendered image to generate a feature vector representation of the new font, the feature vector representation for use in determining a level of similarity between the new font and at least one other font; and store the feature vector representation of the new font in a dynamic supplemental font list updateable by the single computing device to enable a user of the single computing device to identify one or more fonts installed on the single computing device that are similar to the new font, wherein the dynamic supplemental font list includes feature vector representations generated by the single computing device for new fonts installed on the single computing device and absent from the static pre-computed font list.

19. The computing system of claim 18, wherein the plurality of font representations is a first plurality of font representations and the plurality of fonts is a first plurality of fonts, and wherein the font similarity system is further to:

receive a font similarity request that includes an identifier of a user selected font, the font similarity request indicating that the user would like to view fonts that are similar to the selected font;

retrieve a feature vector representation of the selected font from either the static pre-computed font list or the dynamic supplemental font list utilizing the identifier of the selected font;

determine fonts that are within a threshold of similarity to the selected font based on a comparison of the feature vector representation of the selected font against:
    at least a first subset of the first plurality of feature vector representations included within the static pre-computed font list; and
    at least a second subset of a second plurality of feature vector representations included in the dynamic supplemental font list; and output identifiers associated with the determined fonts to cause the determined fonts to be displayed to the user to enable the user to determine whether to utilize one of the determined fonts instead of the selected font.

20. The computing system of claim 19, wherein to determine fonts that are within a threshold of similarity to the selected font comprises:

calculation of a font similarity score for each of the at least first subset of the first plurality of font representations and each of the at least second subset of the second plurality of font representations, the font similarity score indicating a level of similarity between a respective font representation and the font representation of the selected font.

* * * * *